United States Patent [19]

Matsuda et al.

[11] Patent Number: 5,521,252

[45] Date of Patent: May 28, 1996

[54] ACRYLIC MULTILAYER POLYMER POWDER

[75] Inventors: Kaoru Matsuda; Hirofumi Uno; Akihiro Toritani; Jun Nakauchi, all of Otake, Japan

[73] Assignee: Mitsubishi Rayon Company Ltd., Tokyo, Japan

[21] Appl. No.: 390,038

[22] Filed: Feb. 17, 1995

[51] Int. Cl.$^6$ ...................................................... C08J 3/16
[52] U.S. Cl. ..................... 525/255; 525/366; 525/902; 528/486; 528/488; 528/502 C; 521/66; 521/149
[58] Field of Search ...................................... 525/255, 366, 525/902; 528/486, 488, 502 C; 523/201; 521/66, 149

[56] References Cited

U.S. PATENT DOCUMENTS

| | | | |
|---|---|---|---|
| 3,843,753 | 10/1974 | Owens | 525/72 |
| 4,730,023 | 3/1988 | Sato et al. | 525/73 |
| 5,312,575 | 4/1994 | Wills | 264/109 |

FOREIGN PATENT DOCUMENTS

| | | |
|---|---|---|
| 0223992 | 6/1987 | European Pat. Off. . |
| 0282979 | 9/1988 | European Pat. Off. . |
| 62-230841 | 10/1987 | Japan . |

OTHER PUBLICATIONS

E. W. Washburn, (1921) Proc. Nat. Acad. SCI, USA, 7, 715–6.

"Mercury Pressure Porosimetry," product data sheet of Carlo Erba Strumentazione.

*Primary Examiner*—Mark Nagumo
*Attorney, Agent, or Firm*—Oblon, Spivak, McClelland, Maier & Neustadt

[57] ABSTRACT

Acrylic multilayer polymer powders containing coagulated powders of emulsified latexes of acrylic multilayer polymers, which are suitable for drying methods using pressure dehydration extruders, etc, comprises not more than 40 wt % of a fine powder of a particle size of 212 μm or less after drying, and have a volume of gaps of a pore size of 5 μm or less after drying of not more than 0.7 cc per unit weight as measured by a mercurial pressure method. A desired monomer is subjected to emulsion polymerization to produce an emulsified latex of an acrylic multilayer polymer, which is then poured into a coagulating solution for coagulation.

12 Claims, 1 Drawing Sheet

ACRYLIC MULTILAYER POLYMER POWDER

BACKGROUND OF THE INVENTION

1. Field of the Invention

The present invention relates to acrylic multilayer polymer powders. Specifically, it relates to acrylic multilayer polymer powders with excellent drying properties, which contain coagulated powder obtained from the polymer latex of an emulsion polymer.

2. Description of the Related Art

Methacrylic resins, while having excellent weather resistance, luster and transparency also have the disadvantage of low impact resistance, which has led to a desire for their improvement. The introduction of acrylic elastomers thereto is an effective means of imparting impact resistance while maintaining weather resistance, and there have hitherto been known methods of blending rubber polymer/rigid polymer double layer polymers and semi-rubber polymer/rubber polymer/rigid polymer triple-layer polymers (U.S. Pat. No. 3,808,180, No. 3,843,753 and No. 4,730,023 and Japanese Unexamined Patent Publication No. 62-230841).

In these methods, in order to impart impact resistance to the methacrylic resin without sacrificing its original luster and transparency, it is necessary to reduce the proportion of the rubber components such as alkyl acrylate, and raise the relative proportion of rigid monomer components such as alkyl methacrylate ester in the multilayer polymer. The rubber component has a greater variation in the refractive index due to heat, so that the optical properties tends to be thus impaired by heat changes when the proportion of the rubber component portion becomes high. Consequently, such multilayer polymers are inevitably rigid, and have melting points exceeding 235° C. which is considered relatively high.

On the other hand, multilayer polymers are generally produced by emulsion polymerization, after coagulation of the emulsified latex, via dehydration and drying. Here, in the case of rigid multilayer polymers with relatively high melting points, fusion between the polymer particles in the latex during coagulation does not easily occur, and the water content of the polymers recovered in the wet state tends to become relatively high. As a result, a large amount of heat is required for drying when a press dehydration extruder or fluidized drier is used, which leads to problems such as lower drying efficiency and increased product cost.

SUMMARY OF THE INVENTION

In light of these circumstances, the present inventors studied the structures of coagulated powders of relatively rigid acrylic multilayer polymers, and with a melt-initiating point of 235° C. or higher, for excellent drying properties and, as a result, have found that coagulated powders have a specific pore structure and that those with relatively low proportions of fine powder are suited to drying methods using pressure dehydration extruders and the like, and provide excellent drying efficiency.

Therefore, the present invention provides an acrylic multilayer polymer powder which comprises a coagulated powder obtained by coagulating an emulsified latex of an acrylic multilayer polymer witch a melt-initiating point of 235° C. or higher and having at least one soft polymer inner layer comprising a polymer with a glass transition point Tg of 25° C. or lower when polymerized alone and a rigid polymer outermost layer comprising a polymer with a glass transition point Tg of 50° C. or higher when polymerized alone, the coagulated powder after drying comprising not more than 40 wt % of a fine powder of a particle size of 212 μm or less, and the volume of gaps of pore size 5 μm or less in the coagulated powder after drying being not more than 0.7 cc per dry unit weight as measured by a mercurial pressure method.

DESCRIPTION OF THE PREFERRED EMBODIMENTS

Figure 1:
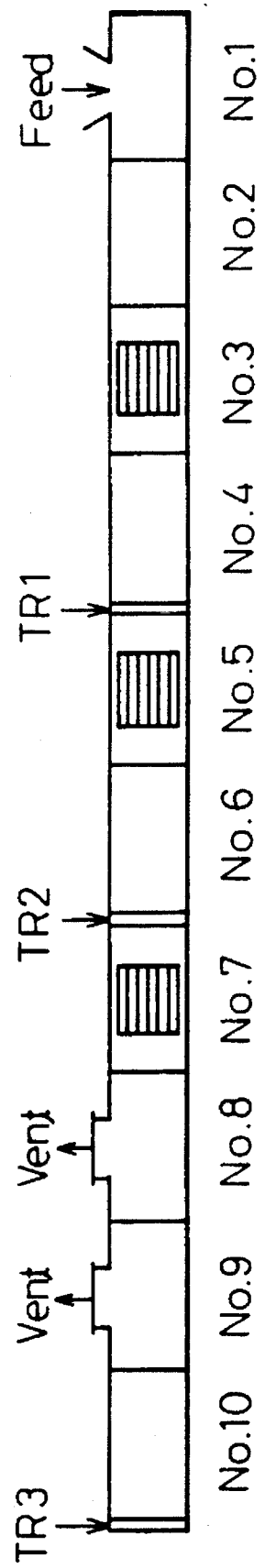
FIG. 1 is a block diagram sketch of a twin-screw pressure dehydration extruder used to measure dehydration rates.

The multilayer polymers useful for the present invention have at least one soft polymer inner layer comprising a polymer with a glass transition point of 25° C. or lower when polymerized alone and a rigid polymer outermost layer comprising a polymer with a glass transition point Tg of 50° C. or higher when polymerized alone.

The polymer used to form the soft polymer layer may be, for example, a polymer prepared from 40–90 wt % of an alkyl acrylate with an alkyl group of 8 carbon atoms or less, and 10–60 wt % of a monofunctional monomer with at least one vinyl group which is copolymerizable therewith and, with respect to 100 wt % of these monomer components, 0.1–10 wt % of a graft-linking agent and 0.1–10 wt % of a polyfunctional crosslinking agent with at least 2 vinyl groups. The proportion of the monofunctional monomer and the alkyl acrylate is determined based on the refractive index in cases where transparency is required for the resin composition. When the amount of the alkyl acrylate is less than 40%, the impact resistance of the obtained polymer tends to be low. A lower Tg of the soft polymer will give more satisfactory impact resistance to the resulting resin composition at low temperatures, and therefore the Tg of the soft polymer, when polymerized alone, should be 25° C. or lower, and preferably 10° C. or lower.

Examples of alkyl acrylates having alkyl groups of 8 carbon atoms or less include methyl acrylate, ethyl acrylate, propyl acrylate, n-butyl acrylate, 2-ethylhexyl acrylate and the like, with n-butyl acrylate being preferred. These may be used alone or as 2 or more in combination. Examples of copolymerizable monofunctional monomers include aromatic unsaturated monomers such as styrene, vinyltoluene and α-methylstyrene, and vinyl monomers such as phenyl methacrylate and naphthyl methacrylate. Styrene is particularly preferred as a monomer for adjusting the refractive index.

The graft-linking agent :has at least one functional group whose reactivity differs from the reactivities of the others, and as examples there may be mentioned allyl esters of acrylic acid, methacrylic acid, maleic acid and fumaric acid, with allyl acrylate and allyl methacrylate being preferred. Also, the polyfunctional crosslinking agent has multiple functional groups whose reactivities are the same and, as examples, 1,3-butylene dimethacrylate and 1,4-butanediol diacrylate may be mentioned.

On the other hand, the polymer forming the outermost layer is a rigid polymer with a Tg of 50° C. or higher when polymerized alone and, as examples, there may be mentioned those prepared from 60–100 wt % of an alkyl methacrylate with an alkyl group of 4 carbon atoms or less and 0–40 wt % of an unsaturated monomer which is copolymerizable therewith.

Examples of alkyl methacrylates with an alkyl group of 4 carbon atoms or less are methyl methacrylate, ethyl methacrylate and n-butyl methacrylate, with methyl methacrylate being particularly preferred. Also, unsaturated monomers copolymerizable therewith include, in addition to all of the above-mentioned monomers except for the graft-linking agent and the polyfunctional crosslinking agent, 1,3-butadiene, 2,3-butadiene, vinyl toluene, cyclohexyl methacrylate, benzyl methacrylate, acrylonitrile, methacrylonitrile and the like, which may be used alone or in combinations of 2 or more thereof.

This outermost layer grafts with the inner layer, serving to improve the affinity between the elastomer and the matrix resin and to cover the elastomer to facilitate its handling. Consequently, the proportion of the outermost layer to the entire amount is preferably from 10 wt % to 60 wt %. At less than 10 wt %, the affinity with the matrix resin is poor and the covering of the elastomer is incomplete, leading to greater adhesion and more difficult handling. Conversely, if it exceeds 60 wt % the content of the elastomer compared to the total amount is reduced, resulting in poor expression of the effect of improved impact resistance.

The inner layer and outermost layer of the multilayer polymer according to the present invention may have any desired structure so long as the above conditions for the Tg and composition are fulfilled. Therefore, the inner layer may be multilayered with two or more layers including an intermediate and an innermost layer, so long as at least one is a soft polymer layer. As concrete structures there may be mentioned, for example, a 2-layer polymer with an inner soft polymer layer and an outer rigid polymer layer; a 3-layer polymer with an innermost rigid polymer layer, an intermediate soft polymer layer and an outermost rigid polymer layer; and a 4-layer polymer with an innermost soft polymer layer, a second rigid polymer layer, a third soft polymer layer and an outermost hard polymer layer. In each of these constructions, there are no restrictions on the Tg of the hard polymer layers other than the outermost layer and the Tg of the layers other than one of the soft polymer layers.

As more concrete examples of the acrylic multilayer polymer in the present invention there may be mentioned 3-layer polymers of which (α) 20–30 wt % is an innermost polymer layer obtained by polymerizing a mixture comprising 5–70 wt % of at least one selected from alkyl acrylates with an alkyl group of 8 carbon atoms or less and styrene, 30–95 wt % of methyl methacrylate, and 0.2–5 wt % of a graft-linking agent and 1–5 wt % of a polyfunctional crosslinking agent with respect to 100 wt % of these monomers; (β) 25–45 wt % is an intermediate polymer layer obtained by polymerizing a mixture comprising 70–90 wt % of an alkyl acrylate with an alkyl group of 8 carbon atoms or less, 10–30 wt % of an aromatic vinyl monomer, and 1–3 wt % of a graft-linking agent and 0.1–1 wt % of a polyfunctional crosslinking agent with respect to 100 wt % of these monomers; and (γ) 35–55 wt % is an outermost layer obtained by polymerizing a mixture comprising 85–97 wt % of methyl methacrylate and 3–15 wt % of an alkyl acrylate of 4 carbon atoms or less.

The alkyl acrylate with an alkyl group of 8 carbon atoms or less and the alkyl acrylate with an alkyl group of 4 carbon atoms or less may be, for example, any of the ones mentioned previously. Also, the graft-linking agent and the polyfunctional crosslinking agent may be, for example, any of the ones mentioned previously.

The acrylic multilayer polymer in the present invention is produced by emulsion polymerization, which may be carried out with any desired monomer composition within the range allowing the formation of the polymer-constructing units mentioned above.

The method for initiating the polymerization is not particularly limited, but it is preferably carried out using, as a radical polymerization initiator, a redox initiator comprising, for example, a peroxide such as benzoyl peroxide, cumene hydroperoxide, or hydrogen peroxide, an azo compound such as azobisisobutyronitrile, a persulfate compound such as ammonium persulfate or potassium persulfate, a perchlorate compound, a perborate compound or a combination of a peroxide and a reducing sulfoxy compound.

Furthermore, the above-mentioned monomers and polymerization initiators, etc. may be added by any desired publicly known method., including batch addition, block addition, continuous addition, monomer addition, emulsion addition, etc.

There may also be employed methods wherein the reaction system is nitrogen-purged to smooth the progress of the reaction, wherein the reaction system is heated after completion of the reaction to remove the residual monomers, and wherein special catalysts are added.

The polymerization temperature for forming each of the polymer layers is preferably in the range of 30°–120° C., and more preferably 50°–100° C. Also, the monomer/water ratio is not particularly restricted, and may be about 1/1 to 1/5, normally being in the range of 1/1.5 to 1/3. Other additives may also be added which are commonly added during polymerization, including chain transfer agents, ultraviolet absorbers, and the like.

The emulsifier to be used according to the present invention is not particularly restricted, but it is preferable to use a compound with a group in its molecule represented by $-PO_3M_2$ or $-PO_2M$ (where M represents an alkali metal or alkaline earth metal), because when polymers obtained by coagulation with an aqueous solution of calcium acetate are added to methacrylic resins as described later, there is less metal corrosion by the resin composition without causing the thermal coloring of the molded products obtained from the resin composition.

As concrete examples of the emulsifying agent there may be mentioned phosphate esters represented by the following general formulas [I] and [II]

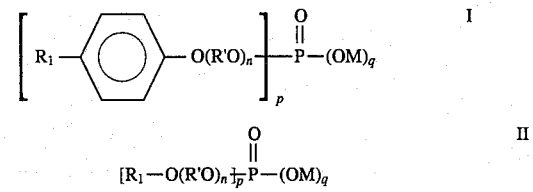

where each $R_1$ represents an alkyl or alkenyl group of 4 to 8 carbon atoms, each R' represents an ethylene or propylene group, each M represents an alkali metal or alkaline earth metal, n is an integer from 4–8, p and q are each 1 or 2, and p+q is 3, as well as mixtures thereof, and preferred examples of the phosphate esters include alkali metal or alkaline earth metal salts of mono-n-butylphenylpentaoxyethylene phosphoric acid, di-n-butylphenylpentaoxyethylene phosphoric acid, mono-n-pentylphenylhexaoxyethylene phosphoric acid, di-n-pentylphenylhexaoxyethylene phosphoric acid, mono-n-heptylphenylpentaoxyethylene phosphoric acid, di-n-heptylphenylpentaoxyethylene phosphoric acid, mono-n-pentyloxyheptaoxyethylene phosphoric acid, di-n-pentyloxyheptaoxyethylene phosphoric acid, mono-n-hexyloxypentaoxyethylene phosphoric acid or di-n-hexyloxypentaoxyethylene phosphoric acid. The alkali metal is preferably sodium or potassium, and the alkaline earth metal salt is preferably calcium or barium. These phosphate esters may be used alone or as mixtures of the various monoesters and diesters.

Also, the amount of the phosphate ester used depends very much on the type of monomer(s) polymerized, the polymerization conditions, etc., and therefore it cannot be defined for all cases; however, according to the present invention it is preferably within the range of 0.1–10 parts by weight, and more preferably 0.5–5 parts by weight, to 100 parts by weight of the monomer.

The method of coagulating the emulsified latex to recover the polymer according to the present invention is not particularly restricted, but for a higher drying efficiency there are preferred methods by which the coagulated powder has low water content and a low amount of fine powder. Specifically there may be mentioned, for example, a coagulating method in which the latex obtained by emulsion polymerization is poured at a linear rate of 0.5 m/sec or less into a coagulating solution at a temperature of 90° C. or higher which comprises an aqueous solution containing calcium acetate at a concentration of 1.8–20 wt %.

The temperature of the coagulating solution required to obtain coagulated powder with the intended low water content and low proportion of fine powder cannot be given for all cases since it will be affected by the type and amount of monomer(s) used for the desired polymer and the coagulating conditions such as the shear force produced by stirring. However, it should generally be 90° C. or higher, and preferably in the range of 90° C.–100° C. When the coagulating temperature is less than 90° C., the water content of the coagulated powder may become high and a large amount of fine powder may be produced.

There are also no particularly restrictions on the type of coagulating agent, but for lower water content it is preferably a calcium ion-containing water-soluble compound which has a relatively high coagulating strength, such as an aqueous solution of calcium acetate. The concentration of the aqueous calcium acetate solution is generally 1.8–20 wt %, and preferably 1.8–5 wt %. It is not preferred to be less than 1.8 wt % as stabilization may occur making it impossible to obtain the polymer, and a higher water ratio of the coagulated powder may result, nor higher than 20 wt % because the calcium acetate sometimes precipitates out depending on temperature changes in the calcium acetate solution. From the point of view of cost, the amount of calcium acetate used is preferably as small as possible.

The coagulating agent may alternatively be magnesium sulfate or aluminum sulfate, but because of the weak coagulating strength of magnesium sulfate, it gives relatively high water contents at temperatures of 100° C. and lower. Thus, with this method it becomes necessary to subject the obtained wet polymer to high temperature and pressure treatment to lower the water content. On the other hand, coagulation with aluminum sulfate gives relatively lower water contents because of the high coagulating strength of aluminum ion, but when the resulting polymer is added to the methacrylic resin, the resin composition turns yellowish thus impairing the optical properties, and there is a tendency toward a polymer with greater susceptibility to thermal coloring.

The calcium acetate to be used for the recovery may, if necessary, be used together with another acid or base, but it is preferably not used together with inorganic salts such as sulfates or carbonates because insoluble calcium salts are formed.

The rate of pouring the latex into the coagulating solution is also affected by the other coagulating conditions and therefore cannot be given for all cases, but the coagulation is best performed at a linear rate of 0.5 m/sec or less. When the linear rate exceeds 0.5 m/sec, the water content of the coagulated powder tends to be relatively high.

The coagulated powder (wet polymer) obtained by coagulation of the emulsified latex is usually washed with about a 1- to 100-fold amount of water. Then, after dehydration with a centrifugal dehydrator or a decanter dehydrator, it is dried with a pressure dehydrator or a fluidized drier. The drying is more efficient for coagulated powders with lower water contents.

Here, the water to be eliminated is present in the minute gaps, of a few μm or less in size, which exist in the coagulated powder. Therefore, the water content is lower and thus the drying efficiency is better with coagulated powder whose volume of gaps with a diameter of 5 μm and less after drying is not more than 0.7 cc per dry unit weight, as measured by the mercurial pressure method. Powders whose volume of gaps with a diameter of 5 μm and less is greater than 0.7 cc per dry unit weight have a relatively larger water content in the coagulated powder, and thus a slower drying speed.

Low water content is not the only property of coagulated powder which allows efficient drying with a press dehydration extruder, but a large average size of the coagulated powder and a low fine powder content are also effective. Specifically, the coagulated powder should have the above-mentioned gap structure after drying, with not more than 40 wt % of fine powder with a size of 212 μm and smaller. Coagulated powder with more than 40 wt % of fine powder with a size of 212 μm and less after drying causes considerable retention of the removed water in the pressuring section when larger amounts of the coagulated powder are fed, tending to produce the phenomenon of surging. Consequently, the feeding of the coagulated powder to the pressure dehydration extruder must be limited, and therefore the threshold feed rate is lowered.

Drying with a press dehydrator is particularly preferred since it provides dry powder in granular form with excellent handleability. Drying by fluidized drier tends to yield a lower bulk density, and in many cases the flowability of the powder is poor, causing powder blocking. There is also the problem that the powder tends to fly and thus have inferior workability and invite the danger of dust explosion. Drying by press dehydration eliminates these inconveniences while providing granular powder with excellent workability.

The multilayer polymer powder obtained by drying may then be treated by a publicly known method involving the addition of methacrylic resin and, if necessary, a stabilizer, plasticizer, dye, etc. and mixing with a Henschel mixer or the like, followed by melting and kneading at 200°–300° C. with an extruder, and the forming may be carried out by a publicly known method such as injection molding. The nature of the methacrylic resin used at this time is not particularly restricted, but it may comprise, for example, 80–100 wt % of methyl methacrylate, 0–20 wt % of an alkyl acrylate with an alkyl group of 8 carbon atoms or less, and 0–20 wt % of a vinyl unsaturated monomer copolymerizable therewith. The alkyl acrylate with an alkyl group of 8 carbon atoms or less may be any of the examples mentioned above.

There are no restrictions on the mixing ratio for mixing the multilayer polymer powder and the methacrylic resin, and depending on the case it may consist entirely of the multilayer polymer powder. However, to maintain the molding workability, the multilayer elastomer content is preferably 1–50 wt %.

The present invention is further explained below with respect to the examples. In these examples, "parts" refers to "parts by weight", and "%" refers to "wt %".

Also, the evaluation of the optical characteristics and the Izod impact strength in the examples was made using specimens obtained by injection molding under the following conditions.

Injection molder: V-17-65 screw autoinjection molder, product of Nihon Seikosho, KK.

Injection molding conditions: Cylinder temperature, 250° C.; injection pressure, 700 kg/cm$^2$ Specimen size: 110 mm×110 mm×2 mm 70 mm×12.5 mm×6.2 mm 1. The melting points of the polymers were measured using a flow tester under the following conditions.

Cylinder pressure: 20 kgf/cm$^2$

Die: L=10.00 mm, D=1.00 mm

Shear stress: 4.903E5 dyn/cm$^2$

Initial temperature: 100° C.

Elevation rate: 6.0° C./min

Preheating time: 300 seconds

2. The water content (Wc) % was determined by heat drying 5 g of the wet polymer at 180° C. for 1 hour and measuring the dry weight ($W_D$), and then using the equation $W_C=[(5-W_D)/W_D]\times 100$.

3. The measurement of the average particle size was according to the following method. That is, about 10 g of the dry powder obtained by drying the wet polymer at 75° C. for 24 hours was placed at the top stage of a stack of sieves of mesh 63 μm, 106 μm, 212 μm, 300 μm, 500 μm, 850 μm, 1400 μm and 2000 μm stacked with the largest mesh on top, and was sifted for 30 minutes using an electrodynamic vibrator. Then, the weights of powder on each stage of the stacked sieves were measured, the weight passing through the bottom sieve was added, and the average particle size per specimen weight was calculated.

4. The proportion of fine powder was determined by following the same procedure as in 3. above, and calculating the proportion per specimen weight from the weight of powder passing through the 212 μm sieve.

5. The measurement of the pore size volume was performed using as the specimen dry powder obtained by drying the wet polymer at 75° C. for 24 hours. This specimen (about 0.12 g) was added to a glass capillary and deaired for 30 minutes to a vacuum, after which the capillary was filled with mercury and the measurement was performed using a porosimeter. (AMCO Model 2000).

6. The metal corroding properties were evaluated based on the following criteria, after placing mirror-polished common soft steel in the extruded pellets, allowing it to stand at 250° C. for 60 minutes, and observing the surface thereof.

o No change in surface

Δ Reduction in surface metal luster x Loss of surface metal luster

7. The total transparency (total light transmittance) was measured according to ASTM D-1003.

8. The cloudiness value was measured according to ASTM D-1003.

9. The YI value was measured according to ASTM D-1925.

10. The Izod impact strength (notched) was measured according to ASTM D-256.

11. The fluidized drying properties were evaluated by drying {5×(100+$W_C$)} g of dry polymer, weighed to a dry powder weight of 500 g, for 40 minutes at a hot air temperature of 70° C., an air flow of 71 cm$^3$/sec, and a blowing rate of the heated air of 40 cm/sec, and measuring the water content at that time.

12. The rate of dehydration by pressure dehydration extruder was determined under the following conditions.

Pressure dehydration extruder: TEM-120 twin-screw type, product of Toshiba Kikai, KK.

Barrel diameter: 120 mm

Screw rotation rate: 50–200 rpm

Dehydration slit gap: 0.2 mm

Cylinder setting temperature: C1/C2/C3/C4/C5/C6=140/180/180/150/150/150 (°C.)

The extruder is constructed with a total of 10 barrel blocks No.1 to No.10 serially anchored so that each of the two screw shaft axes are parallel, and two identically shaped and engaged screws are inserted inside the barrels with their axes parallel.

The barrel is constructed, as shown in FIG. 1, with barrel blocks 1, 2, 4, 6, 8, 9 and 10 having the same structure as used for a common twin-screw extruder, and thus they have no special structure. At the inner sides of barrel blocks 3, 5 and 7 there are formed a plurality of dehydration slits through which gaps only liquid may flow. The raw material feed opening on the top of barrel block No.1 is equipped with a hopper, and a raw material feeding apparatus is mounted over the hopper.

The screws inserted into the barrels constructed in the above-mentioned manner are constructed with an appropriate combination of screw blocks and kneading disks with various screw structures and lengths for a variety of constructions. According to the present embodiment, various screw blocks and kneading disks are combined to obtain two screws with identical structures and a total length of 4465 mm.

Figure 2:
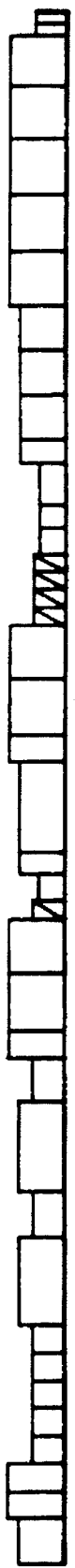
FIG. 2 is a block diagram of the screw of the extruder shown in FIG. 1.

FIG. 2 shows the structure of the above-mentioned screws in the axial direction, and there are connected screws [S: block length/lead length (number)] and kneading disks [N: block length/piece (number)] in the following order toward the end of the barrels: two pieces of 5 mm O-rings for adjusting the length from the driving axis end, S160/160 (5), S130/130 (3), S65/130 (1), N130/7 (1), N65/5 (1), N80/7 (1), L50/100 (4), S160/160 (2), S80/160 (1), S260/130 (1), S65/130 (1), N80/7 (1), L50/100 (1), S160/160 (2), S80/160 (1), N130/7 (1), S260/130 (1), N130/7 (1), S260/130 (1), N80/7 (5), S80/160 (2), S130/130 (1). In this list, S indicates screw blocks, N indicates kneading disks, and the blocks labelled L twist to the left while those blocks not labelled L twist to the right, or in the forward direction.

The pair of screws having this construction are inserted through the above-mentioned barrel 2 in an engaged state, and the proximal ends thereof are connected to a driving power source provided with a speed-variable function.

Consequently, in the twin-screw dehydrator of the present embodiment obtained in this manner, the section of barrel block No.1 is the raw material feeding section, barrel block Nos. 3, 5 and 7 are the dehydrating sections, and barrel block Nos. 4 and 6 are pressing sections consisting of kneading disks and reverse screw blocks.

When the wet polymer obtained by centrifugal dehydration after coagulation is fed to this type of twin-screw pressure dehydration extruder from the raw material feed opening, a flaky melted polymer is obtained at the outlet opening of barrel block No.10. The maximum feeding amount at which a flaky polymer could be stably obtained, when the dehydration rates of each of the wet polymers were raised while maintaining a balance between the feeding amount of the wet polymer and the revolving rate of the driving shaft, was indicated in terms of the amount of dry polymer.

EXAMPLE 1

(A) 300 parts of deionized water were charged into a stainless steel reactor and then heated, and when the internal temperature reached 80° C. a mixture having the following composition was poured therein.

Deionized water 5 parts
Formaldehyde sodium sulfoxylate . $2H_2O$ (hereunder, "Rongalite") 0.48 part
Iron (I) sulfate $0.4 \times 10^{-6}$ parts
Disodium ethylenediamine tetracetate $1.2 \times 10^{-6}$ parts The resulting mixture was kept at 80° C. for 15 minutes, after which the mixture with the following composition which had been presubstituted with nitrogen was added dropwise thereto over 2 hours, and the mixture was polymerized for one hour while at 80° C. The degree of polymerization of the resulting latex was over 99%.

Mixture of 54.0% methyl methacrylate, 5.0% styrene and 41.0% butyl acrylate 40 parts
1,3-butylene dimethacrylate 1.1 parts
Diallyl maleate 0.14 part
t-butylhydroperoxide 0.08 part
1:1 mixture of sodium mono-n-pentylphenylhexaoxyethylene phosphate and sodium di-n-pentylphenylhexaoxyethylene phosphate (hereunder, emulsifier A) 1.20 parts (B) Next, the following mixture (i) was poured into the above-mentioned reactor at 80° C. and kept for 15 minutes, after which the following mixture (ii) which had been presubstituted with nitrogen was added thereto dropwise over 3 hours and further polymerized for 3 hours. The degree of polymerization of the resulting latex was over 99%, and the particle size was 0.25 μm.

(i) Rongalite 0.2 part
Deionized water 5 parts
(ii) Styrene 10.0 parts
Butyl acrylate 50.0 parts
1,3-butylene dimethacrylate 0.2 part
Diallyl maleate 1.0 part
Cumene hydroperoxide 0.17 part
Emulsifier A 1.8 parts (C) Next, the following mixture (iii) was poured into the reactor and kept for 30 minutes, after which the following mixture (iv) which had been presubstituted with nitrogen was added dropwise thereto over 4 hours, and further polymerized for one hour. The degree of polymerization of the resulting latex was over 99%, and the particle size was 0.27 μm.

The polymer latex obtained in the above manner is hereunder referred to as Lx-1.

(iii) Rongalite 0.2 part
Deionized water 5 parts
(iv) Methyl methacrylate 57 parts
Methyl acrylate 3 parts
t-butylhydroperoxide 0.1 part Normal octylmercaptane 0.2 part (D) A 1.8% aqueous calcium acetate solution was charged into a stainless steel container as a recovering agent and the temperature was raised to 90° C. while stirring, after which the latex produced earlier was added continuously at a linear rate of not more than 0.5 m/sec, and the mixture was kept at the same temperature for 30 minutes. After cooling to room temperature, the polymer was filtered with a centrifugal dehydrator while washing with deionized water to obtain a wet white polymer. This was dried with a pressure dehydrator or a fluidized drier to obtain polymer A. The coagulated powder properties and the drying properties thereof are given in Table 1.

EXAMPLE 2

(A) 300 parts of deionized water were charged into a stainless steel reactor and then heated, and when the internal temperature reached 80° C. the mixture having the following composition was poured therein.

Rongalite 0.48 part
Iron (I) sulfate $0.4 \times 10^{-6}$ part
Disodium ethylenediamine tetracetate $1.2 \times 10^{-6}$ parts The resulting mixture was kept at 80° C. for 15 minutes, after which the mixture with the following composition which had been presubstituted with nitrogen was added dropwise thereto over 2 hours, and the mixture was polymerized for one hour while at 80° C. The degree of polymerization of the resulting latex was over 99%.

Mixture of 54.0% methyl methacrylate, 6.0% styrene and 40.0% butyl acrylate 40 parts
1,3-butylene dimethacrylate 1.1 parts
Diallyl maleate 0.14 part
t-butylhydroperoxide 0.08 part
Emulsifier A 1.20 parts (B) Next, the following mixture (i) was poured into the above-mentioned reactor at 80° C. and kept for 15 minutes, after which the following mixture (ii) which had been presubstituted with nitrogen was added thereto dropwise over 3 hours and further polymerized for 3 hours. The degree of polymerization of the resulting latex was over 99%, and the particle size was 0.23 μm.

(i) Rongalite 0.2 part
Deionized water 5 parts
(ii) Styrene 11.0 parts
Butyl acrylate 49.0 parts
1,3-butylene dimethacrylate 0.2 part
Diallyl maleate 1.0 part
Cumene hydroperoxide 0.17 part
Emulsifier A 1.8 parts (C) Next, the following mixture (iii) was poured into the reactor and kept for 30 minutes, after which the following mixture (iv) which had been presubstituted with nitrogen was added dropwise thereto over 3 hours, and further polymerized for one hour. The degree of polymerization of the resulting latex was over 99%, and the particle size was 0.27 μm.

The polymer latex obtained in the above manner is hereunder referred to as Lx-2.

(iii) Rongalite 0.2 part
Deionized water 5 parts
(iv) Methyl methacrylate 95 parts
Methyl acrylate 5 parts t-butylhydroperoxide 0.2 part Normal octylmercaptane 0.3 part (D) A 1.8% aqueous calcium acetate solution was charged into a stainless steel container as a recovering agent and the temperature was raised to 90° C. while stirring, after which the latex produced earlier was added continuously at a linear rate of not more than 0.5 m/sec, and the mixture was kept at the same temperature for 30 minutes. After cooling to room temperature, the polymer was filtered with a centrifugal dehydrator while washing with deionized water to obtain a wet white polymer. This was dried with a pressure dehydrator or a fluidized drier to obtain polymer B. The coagulated powder properties and the drying properties thereof are given in Table 1.

Next, a mixture of 2000 g of this powder and 2000 g of a methacrylic resin (Acrypet (registered trademark) VH: product of Mitsubishi Rayon, KK.) was made into pellets using a screw extruder (Model P-40-26AB-V, L/D=26, product of Nihon Seikosho) with an outer diameter of 40 mmφ, at a cylinder temperature of 200°–260° C. and melting and kneading at a die temperature of 250° C., to obtain an impact resistant methacrylic resin composition with a content of the multilayered acrylic elastomer of 25%.

The results of evaluation of the resin composition are given in Table 2.

EXAMPLE 3

(A) 300 parts of deionized water were charged into a stainless steel reactor and then heated, and when the internal temperature reached 80° C. the mixture having the following composition was poured therein.

Rongalite 0.48 part

Iron (I) sulfate $0.4 \times 10^{-6}$ part

Disodium ethylenediamine tetracetate $1.2 \times 10^{-6}$ parts

The resulting mixture was kept at 80° C. for 15 minutes, after which the mixture with the following composition which had been presubstituted with nitrogen was added dropwise thereto over 2 hours, and the mixture was polymerized for one hour while at 80° C. The degree of polymerization of the resulting latex was over 99%.

Mixture of 33.0% methyl methacrylate and 67.0% methyl acrylate 40 parts 1,3-butylene dimethacrylate 1.1 parts Diallyl maleate 0.14 part t-butylhydroperoxide 0.08 part Emulsifier A 1.20 parts (B) Next, the following mixture (i) was poured into the above-mentioned reactor at 80° C. and kept for 15 minutes, after the following mixture (ii) which had been presubstituted with nitrogen was added thereto dropwise over 3 hours and further polymerized for 3 hours. The degree of polymerization of the resulting latex was over 99%, and the particle size was 0.23 μm.

(i) Rongalite 0.2 part

Deionized water 5 parts (ii) Styrene 11.0 parts

Butyl acrylate 49.0 parts 1,3-butylene dimethacrylate 0.2 part

Diallyl maleate 1.0 part

Cumene hydroperoxide 0.17 part

Emulsifier A 1.8 parts (C) Next, the following mixture (iii) was poured into the reactor and kept for 30 minutes, after which the following mixture (iv) which had been presubstituted with nitrogen was added dropwise thereto over 3 hours, and further polymerized for one hour. The degree of polymerization of the resulting latex was over 99%, and the particle size was 0.27 μm.

(iii) Rongalite 0.2 part

Deionized water 5 parts (iv) Methyl methacrylate 95 parts

Methyl acrylate 5 parts t-butylhydroperoxide 0.2 part

Normal octylmercaptane 0.3 part (D) A 1.8% aqueous calcium acetate solution was charged into a stainless steel container as a recovering agent and the temperature was raised to 90° C. while stirring, after which the latex produced earlier was added continuously at a linear rate of not more than 0.5 m/sec, and the mixture was kept for 30 minutes. After cooling to room temperature, the polymer was filtered with a centrifugal dehydrator while being washed with deionized water to obtain a wet white polymer. This was dried with a pressure dehydrator or a fluidized drier to obtain polymer C. The coagulated powder properties and the drying properties thereof are given in Table 1.

EXAMPLE 4

A 2.6% aqueous magnesium sulfate solution was charged into the reactor as a recovering agent and the temperature was raised to 90° C. while stirring, after which the polymer latex Lx-2 obtained in Example 2 was added continuously at a linear rate of not more than 0.5 m/sec, and the mixture was kept at the same temperature for 30 minutes. Also, the slurry obtained earlier was transferred to a pressurizable GL boiler and kept under pressure at 130° C. for 30 minutes. After cooling to room temperature, the polymer was filtered with a centrifugal dehydrator while being washed with deionized water to obtain a wet white polymer. This was dried with a pressure dehydrator or a fluidized drier to obtain polymer D. The coagulated powder properties and the drying properties thereof are given in Table 1.

COMPARATIVE EXAMPLE 1

A 2.6% aqueous magnesium sulfate solution was charged into the reactor as a recovering agent and the temperature was raised to 90° C. while stirring, after which the polymer latex Lx-1 obtained in Example 1 was continuously added at a linear rate of not more than 0.5 m/sec, and the mixture was kept at the same temperature for 30 minutes. After cooling to room temperature, the polymer was filtered with a centrifugal dehydrator while being washed with deionized water to obtain a wet white polymer. This was dried with a pressure dehydrator or a fluidized drier to obtain polymer E. The coagulated powder properties and the drying properties thereof are given in Table 1.

COMPARATIVE EXAMPLE 2

A 1.8% aqueous magnesium sulfate solution was charged into the reactor as a recovering agent and the temperature was raised to 75° C. while stirring, after which the polymer latex Lx-1 obtained in Example 1 was added continuously at a linear rate of not more than 0.5 m/sec, and the mixture was kept at the same temperature for 30 minutes. After cooling to room temperature, the polymer was filtered with a centrifugal dehydrator while being washed with deionized water to obtain a wet white polymer. This was dried with a pressure dehydrator or a fluidized drier to obtain polymer F.

The coagulated powder properties and the drying properties thereof are given in Table 1.

COMPARATIVE EXAMPLE 3

A 1.8% aqueous calcium acetate solution was charged into the reactor as a recovering agent and the temperature was raised to 90° C. while stirring, after which the polymer latex Lx-1 obtained in Example 1 was added continuously at a linear rate of not more than 0.5 m/sec, and the mixture was kept at the same temperature for 30 minutes. After cooling to room temperature, the polymer was filtered with a centrifugal dehydrator while being washed with deionized water to obtain a wet white polymer. The wet polymer was further stirred with a large-size Henschel mixer to obtain a finely powdered wet polymer. This was dried with a pressure dehydrator or a fluidized drier to obtain polymer G. The coagulated powder properties and the drying properties thereof are given in Table 1.

Experiment 1

A comparison was made of the properties of the dry powders obtained in Example 2, from a pressure dehydration extruder and from a fluidized drier.

The quality was satisfactory in both cases, but since the dry powder obtained by the fluidized drier had an average particle size of 340 μm, which was finer than the pressure dehydration extruded powder which was finely particulate and flaky with an average particle size of 850 μm, it thus lacked fluidity and also exhibited inferior blocking. In addition, when 2000 g of dry powder from the fluidized drier or 2000 g of small particulate flaky dry powder from the pressure dehydrator was mixed with 2000 g of a methacrylic resin (Acrypet (registered trademark) VH: product of Mitsubishi Rayon, KK.) for shaping, the dry powder from the fluidized drier, being a fine powder, produced much flying of the powder dust, while the small particulate flaky dry powder from the pressure dehydrator produced virtually no flying of the powder dust.

TABLE 1

| Acrylic multilayer polymer powder | | Melting point of polymer (°C.) | Coagulated powder | | | | Drying properties | |
|---|---|---|---|---|---|---|---|---|
| | | | Water ratio (%) | Volume of gaps of diameter 5 μm or less (cc/g) | Average particle size (μm) | Proportion of fine powder (%) | Pressure dehydration rate (kg/H) | Water ratio after fluidized drying (%) |
| Ex. 1 | Polymer A | 235 | 55 | 0.63 | 480 | 26 | 450 | 0 |
| 2 | Polymer B | 275 | 56 | 0.63 | 340 | 33 | 450 | 0 |
| 3 | Polymer C | 275 | 58 | 0.65 | 300 | 38 | 400 | 0 |
| 4 | Polymer D | 275 | 35 | 0.30 | 320 | 32 | 460 | 0 |
| Comp. Ex. 1 | Polymer E | 235 | 85 | 1.00 | 460 | 38 | 210 | 17 |
| 2 | Polymer F | 235 | 118 | 1.20 | 310 | 45 | 180 | 25 |
| 3 | Polymer G | 235 | 55 | 0.63 | 180 | 65 | 280 | 0 |

*Fluidized drying performed for 40 minutes.

TABLE 2

| | | Emulsifier | | Cloudiness (%) | YI | Izod impact strength (kg-cm/cm$^2$) | Metal corroding property |
|---|---|---|---|---|---|---|---|
| | Substance | Amount added (parts) | Total transparency (%) | | | | |
| Example 2 | Emulsifier A | 3.0 | 92.1 | 0.9 | 0.8 | 4.8 | o |
| Example 5 | Emulsifier B* | 3.0 | 92.5 | 1.0 | 0.8 | 4.7 | o |
| Example 6 | Sodium N-lauroylsarcosinate | 2.85 | 91.8 | 1.1 | 0.8 | 4.6 | Δ |
| Example 7 | Potassium palmitate | 3.25 | 92.1 | 1.1 | 1.0 | 4.7 | Δ |
| Example 8 | Sodium dioctylsulfosuccinate | 2.70 | 92.3 | 1.0 | 0.9 | 4.8 | Δ |
| Example 9 | Sodium lauryl sulfate | 2.75 | 92.0 | 1.2 | 0.9 | 4.7 | Δ |

Emulsifier B*: 1:1 mixture of sodium mono-n-butylphenylhexaoxyethylene phosphate and sodium di-n-butylphenylpentylphenylhexaoxyethylene phosphate

EXAMPLES 5–9

The procedure in Example 2 was repeated, except that the emulsifiers and their amounts were varied. The results are given in Table 2.

According to the present invention, coagulated powders of acrylic multilayer polymers may be obtained with a specific gap structure and a relatively low proportion of fine powder, and this coagulated powder is suitable for drying using pressure dehydration extruders and the like, with excellent drying efficiency.

We claim:

1. An acrylic multilayer polymer powder which comprises a coagulated powder obtained by coagulating an emulsified latex of an acrylic multilayer polymer with a polymer melt-initiating point of 235° C. or higher and having at least one soft polymer inner layer comprising a polymer with a glass transition point Tg of 25° C. or lower when polymerized alone and a rigid polymer outermost layer comprising a polymer with a glass transition point Tg of 50° C. or higher when polymerized alone, the coagulated powder after drying comprising not more than 40 wt % of a fine powder of a particle size of 212 μm or less, and the volume of gaps of a pore size of 5 μm or less of the coagulated powder after drying being not more than 0.7 cc per dry gram as measured by a mercurial pressure method and wherein said emulsified latex is obtained with an emulsifier containing a group in its molecule represented by —PO$_3$M$_2$ or —PO$_2$M, where M is an alkali metal or alkali earth metal.

2. A powder according to claim 1, wherein the soft polymer layer comprises a polymer prepared from 40–90 wt % of an alkyl acrylate with an alkyl group of 8 carbon atoms or less, 10–60 wt % of a monofunctional monomer with at least one vinyl group which is copolymerizable therewith and, with respect to 100 wt % of these monomer components, 0.1–10 wt % of a graft-linking agent and 0.1–10 wt % of a polyfunctional crosslinking agent with at least 2 vinyl groups.

3. A powder according to claim 1, wherein the rigid polymer layer comprises a polymer prepared from 60–100 wt % of an alkyl methacrylate with an alkyl group of 4 carbon atoms or less and 0–40 wt % of an unsaturated monomer with which it is copolymerizable.

4. A powder according to claim 1, wherein the proportion of the outermost layer to the total amount of the acrylic multilayer polymer is 10–60 wt %.

5. A powder according to claim 1, wherein the acrylic multilayer polymer comprises a 3-layer polymer of which (α) 20–30 wt % is an innermost polymer layer obtained by polymerizing a mixture comprising 5–70 wt % of at least one selected from alkyl acrylates with an alkyl group of 8 carbon atoms or less and styrene, 30–95 wt % of methyl methacrylate, and 0.2–5 wt % of a graft-linking agent and 1–5 wt % of a polyfunctional crosslinking agent with respect to 100 wt % of these monomers; (β) 25–45 wt % is an intermediate polymer layer obtained by polymerizing a mixture comprising 70–90 wt % of an alkyl acrylate with an alkyl group of 8 carbon atoms or less, 10–30 wt % of an aromatic vinyl monomer, 1–3 wt % of a graft-linking agent and 0.1–1 wt % of a polyfunctional crosslinking agent with respect to 100 wt % of these monomers; and (γ) 35–55 wt % is an outermost layer obtained by polymerizing a mixture consisting of 85–97 wt % of methyl methacrylate and 3–15 wt % of an alkyl acrylate of 4 carbon atoms or less.

6. A method for preparing an acrylic multilayer polymer, which comprises the steps of:

polymerizing a first monomer mixture in the presence of an emulsifier, said emulsifier being a compound with a group in its molecule represented by —PO$_3$M$_2$ or —PO$_2$M where M is an alkali metal or alkaline earth metal and wherein said first monomer mixture is at least one monomer able to form at least one soft polymer inner layer with a glass transition point Tg of 25° C. or lower; and, thereafter polymerizing sequentially a second monomer mixture in the presence of said emulsifier and said soft polymer, wherein second monomer mixture is at least one monomer able to form a rigid polymer outermost layer with a glass transition point Tg of 50° C. or higher;

producing an emulsified latex of an acrylic multilayer polymer with a melt-initiating point of 235° C. or higher; and pouring the emulsified latex at a linear rate of 0.5 m/sec or less into an aqueous coagulation solution, at a temperature of 90° C. or higher, said solution comprising calcium acetate at a concentration of 1.8–20 wt %; and coagulating said emulsified latex.

7. The method according to claim 6, wherein the polymer of the soft polymer layer is polymerized using 0–90 wt % of an alkyl acrylate with an alkyl group of 8 carbon atoms or less, 10–60 wt % of a monofunctional monomer with at least one vinyl group which is copolymerizable therewith and, with respect to 100 wt % of these monomer components, 0.1–10 wt % of a graft-linking agent and 0.1–10 wt % of a polyfunctional crosslinking agent with at least 2 vinyl groups.

8. The method according to claim 7, wherein the polymer of the rigid polymer layer is polymerized using 60–100 wt % of an alkyl methacrylate with an alkyl group of 4 carbon atoms or less and 0–40 wt % of an unsaturated monomer which is copolymerizable therewith.

9. The method according to claim 6, wherein the concentration of the aqueous calcium acetate solution is 1.8–5 wt %.

10. The method according to claim 6, wherein the emulsifier is at least one selected from compounds represented by the following general formulas [I] and [II]:

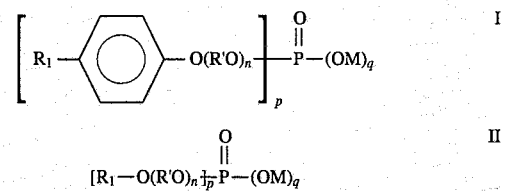

where each R$_1$ represents an alkyl or alkenyl group of 4 to 8 carbon atoms, each R' represents an ethylene or propylene group, each M represents an alkali metal or alkaline earth metal, n is an integer from 4 to 8, p and q are each 1 or 2, and p+q is 3.

11. A method for preparing a granular multilayer polymer powder, which comprises drying by pressure dehydration a coagulated powder obtained by coagulating an emulsified latex of an acrylic multilayer polymer with a melt-initiating point of 235° C. or higher and having at least one soft polymer inner layer comprising a polymer with a glass transition point Tg of 25° C. or lower when polymerized alone and a rigid polymer outermost layer comprising a polymer with a glass transition point Tg of 50° C. or higher when polymerized alone; which coagulated powder after drying gives an acrylic multilayer polymer powder with not more than 40 wt % of a fine powder of a particle size of 212 μm or less, and a volume of gaps of a pore size of 5 μm or less after drying of not more than 0.7 cc per gram as measured by a mercurial pressure method and wherein said emulsified latex is obtained with an emulsifier containing a group in its molecule represented by —PO$_3$M$_2$ or —PO$_2$M, where M is our alkali metal or alkali earth metal.

12. The powder of claim 1 wherein said coagulated powder is obtained by coagulating with calcium acetate.

* * * * *